March 12, 1957 H. L. VON GUGELBERG 2,785,355
MULTICATHODE GASEOUS DISCHARGE DEVICES
Filed Sept. 23, 1949 2 Sheets-Sheet 1
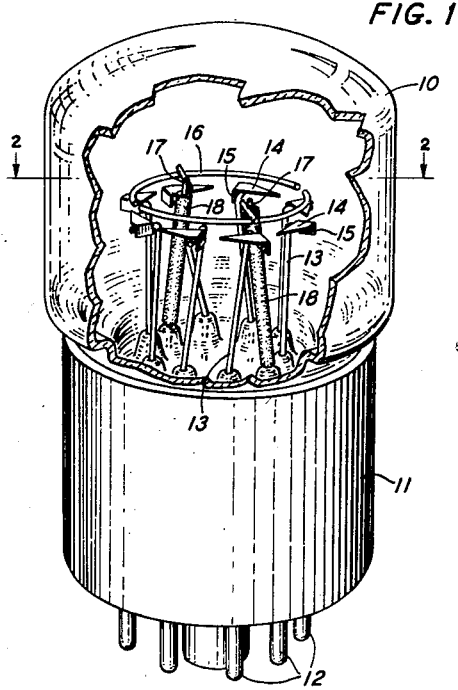
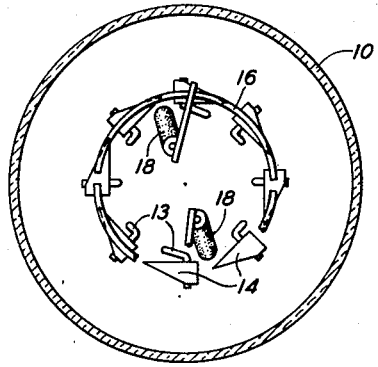
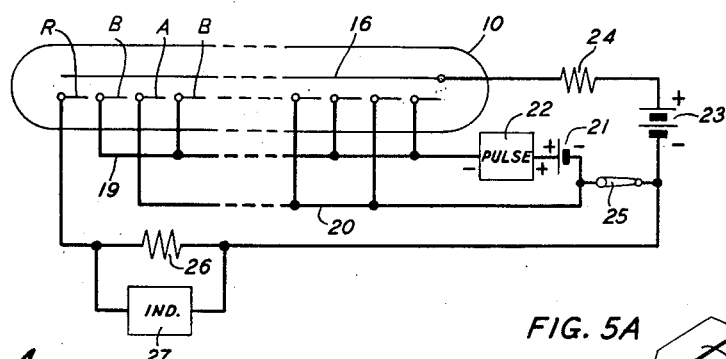
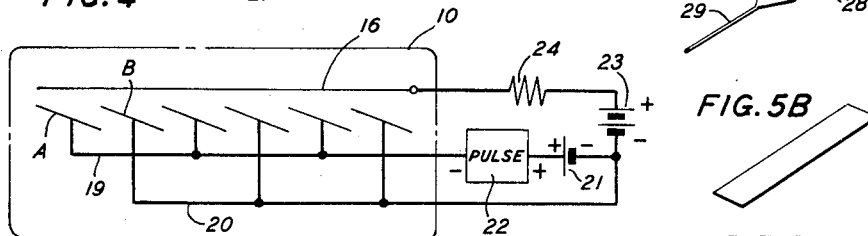
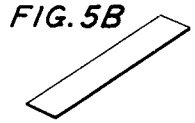
INVENTOR
H. L. VON GUGELBERG
BY
ATTORNEY

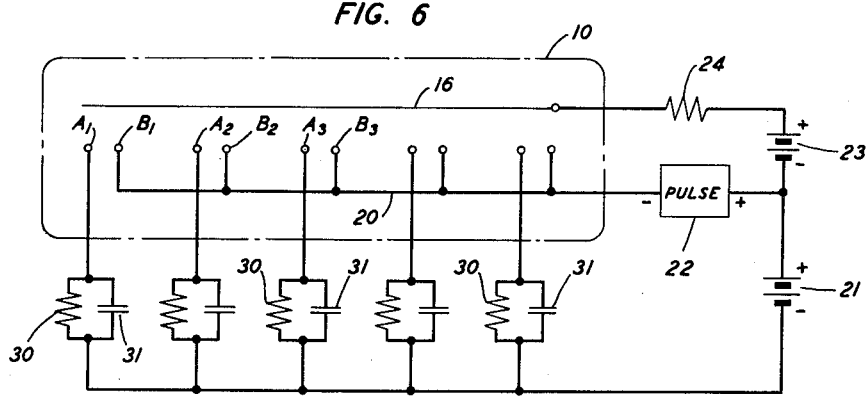
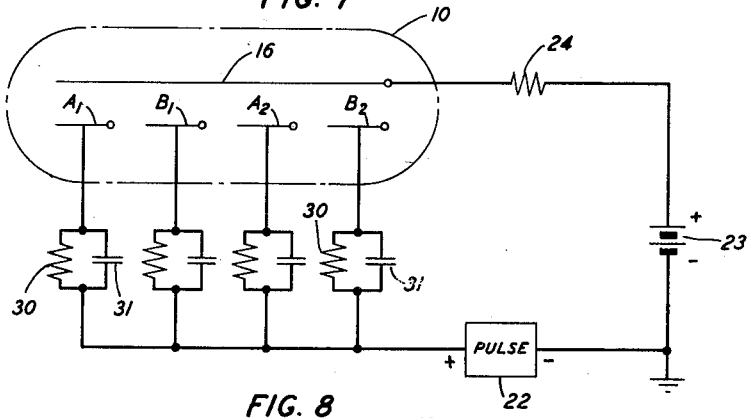
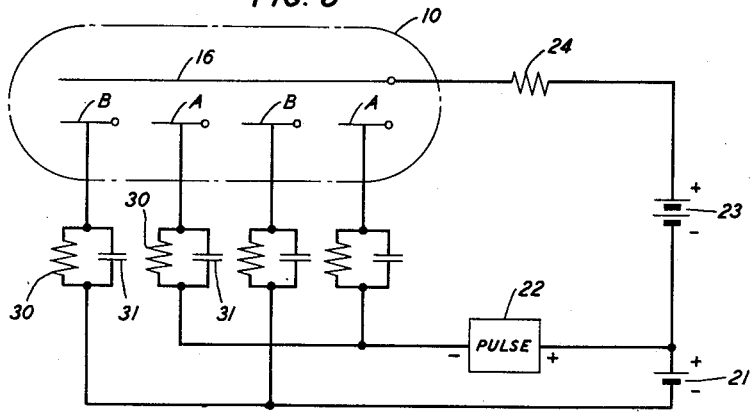
INVENTOR
H. L. VON GUGELBERG
BY
ATTORNEY

United States Patent Office 2,785,355
Patented Mar. 12, 1957

2,785,355
MULTICATHODE GASEOUS DISCHARGE DEVICES

Hans L. von Gugelberg, Murray Hill, N. J., assignor to Bell Telephone Laboratories, Incorporated, New York, N. Y., a corporation of New York Application September 23, 1949, Serial No. 117,316

19 Claims. (Cl. 315—84.6)

This invention relates to gaseous discharge devices and more particularly to multicathode glow discharge devices.

Devices of the type to which this invention pertains comprise, in general, a plurality of cathode elements, an anode associated therewith, and means for energizing the electrodes to effect stepping of the discharge from one gap to another. To assure stepping of the discharge in a desired direction or from one cathode element to a prescribed one of two or more other cathode elements, some mechanism providing preference or selectivity for transfer of the discharge is provided.

Objects of this invention are to simplify the construction of multicathode glow discharge devices of the general type above described, improved the performance of such devices, increase the preference or selectivity, increase the number of stages which can be utilized in a device of a given size, and reduce difficulties associated with and resulting from contamination of the cathodes during operation.

In one illustrative embodiment of this invention, a multicathode glow discharge device comprises a plurality of cathodes mounted in an array or a row and an anode in cooperative relation with the cathodes.

In accordance with one feature of this invention, the several cathodes are arranged relative to one another or the anode or both to provide a preference mechanism such that in response to signal pulses applied to certain of the cathodes, the discharge will advance in a preassigned direction along the array or row.

In accordance with a more specific feature of this invention, the cathodes are spaced relative to one another so that upon application of such pulses, the discharge will advance from each cathode to the next succeeding cathode.

In accordance with another more specific feature of this invention, the cathodes, which may be of similar construction, are inclined at like angles relative to the anode, whereby an end portion of each projects toward the region between the next preceding cathode and the anode at which, when a discharge obtains at such preceding cathode, a high ionization density exists.

In accordance with still another feature of this invention, RC circuits are provided in association with certain or all of the cathodes and have such parameters that when a discharge obtains at any cathode and a signal pulse is applied to the adjacent cathodes, that is the next preceding and next succeeding cathodes, the discharge will transfer to the next succeeding cathode in the row. Specifically, the RC circuits are made such that the time constant thereof is greater than the duration of any applied pulse and also greater than the deionization time of the atmosphere in which the discharge exists, the deionization time also being smaller than the duration of the driving pulse.

The invention and the above-noted and other features thereof will be understood more clearly and fully from the following detailed description with reference to the accompanying drawing in which:

Fig. 1 is a perspective view of a multicathode glow discharge device illustrative of one embodiment of this invention, a portion of the enclosing vessel being broken away to show the internal structure more clearly;

Fig. 2 is a view in section taken along plane 2—2 of Fig. 1;

Fig. 3 is a schematic illustrating one manner in which the device shown in Figs. 1 and 2 may be operated;

Fig. 4 is a diagram illustrating another device construction in accordance with this invention;

Figs. 5A and 5B are detail perspective views showing two forms of cathodes which may be included in the device shown in Fig. 4;

Fig. 6 is a schematic of another illustrative embodiment of this invention wherein the cathode asymmetry is realized by a particular spacing of the several cathodes relative to one another; and Figs. 7 and 8 are schematics illustrating other embodiments of this invention wherein asymmetry or preference is obtained or enhanced by the use of RC circuits in association with the cathodes.

Referring now to the drawing, the device illustrated in Figs. 1 and 2 comprises a vitreous enclosing vessel 10 having an ionizable atmosphere such as a rare gas or a mixture of rare gases therein. The vessel 10 is affixed to and supported by an insulating base 11 having projecting therefrom terminal prongs 12 through which electrical connection may be established to the electrodes of the device.

Mounted within the vessel 10 by rigid leading-in conductors 13, each connected to a respective one of the terminal prongs 12, are a plurality of glow cathodes mounted in circular array. Each of these cathodes, which is of a refractory material such as molybdenum or tantalum, comprises a substantially triangular flat portion 14 and a flange 15, the cathodes being relatively disposed with the apex of each in juxtaposition to the flange of the next preceding cathode. Opposite the cathodes and coaxial with the circle on which they lie is an annular anode 16, for example a wire of molybdenum. The anode is supported by a pair of leading-in conductors encased in insulating, for example ceramic, sleeves 18.

In a typical device, the cathodes may be spaced of the order of $\frac{1}{32}$ inch from one another and the anode may be spaced of the order of .060 inch from each cathode. A suitable ionizable filling for the envelope 10 is argon at a pressure of about 16 millimeters of mercury. For this gas and the electrode spacings above-mentioned, the breakdown voltage for each anode-cathode gap is about 180 volts and the sustaining voltage is substantially 110 volts.

One manner in which the device shown in Figs. 1 and 2 may be operated is illustrated in Fig. 3. For convenience of reference in this figure, one cathode, specifically the cathode at the extreme left in the figure which may serve as a starter or reset cathode, is designated by the letter R and the remaining cathodes are designated A and B, each B cathode being disposed between two A cathodes. All of the B cathodes are connected together electrically by a conductor 19 and the A cathodes are similarly connected by a conductor 20. The B cathodes, as a group, are biased positive with respect to the A cathodes by a direct current source 21. In series with the source 21 is a second source 22 for pulsing the B cathodes negative relative to the A cathodes. The anode 16 is biased positive with respect to all of the cathodes by a source 23 to which it is connected by way of the anode resistor 24. A switch 25, the function of which will appear presently, is provided between the A and B cathodes and the negative terminal of the source 23. The starter or reset cathode R is connected to the negative terminal of the source 23 by way of a resistor 26 across which a pulse responsive indicating device or counter 27 is connected.

When the switch 25 is open all of the cathodes except the starter cathode R are disassociated electrically from the anode and a discharge is established between the cathode R and the anode 16. This discharge will remain at the cathode R even after the switch 25 is closed. Assume now that with the discharge obtaining at the cathode R a pulse is applied between the A and B cathodes by a source 22. The cathode B nearest the cathode R is driven negative relative to the latter cathode and the discharge transfers from the cathode R to this cathode B. Upon cessation of the pulse, the A cathode immediately to the right in Fig. 3 of the cathode B nearest the cathode R becomes negative relative to the B cathode mentioned because of the source 21, and the discharge transfers to this A cathode. For each succeeding pulse applied from the source 22 the discharge is stepped along the array of A and B cathodes moving from one A cathode to the next succeeding one in response to each pulse. The discharge may be returned to the cathode R by opening the switch 25.

It will be appreciated that when the discharge obtains at any of the cathodes, because of the configuration of these cathodes, the greatest density of ionization exists at the cathode portion in the vicinity of the flange 15. Thus the apex of the next succeeding cathode is in the vicinity of a high ionization density region whereas the flange 15 of the next preceding cathode is at a region of very low ionization density. Hence, because of this asymmetry, upon the application of pulses to the B cathodes the discharge will transfer to the next succeeding cathode rather than to the next preceding cathode. This preference is enhanced further by the inherent characteristics of a point on an electrode which are conducive to the initiation of the discharge in the desired direction. Thus, by virtue of the cathode configuration, stepping of the discharge is effected in only one direction, specifically, counter-clockwise in Figs. 1 and 2.

Although in the specific device illustrated in Figs. 1 and 2 eight cathodes providing four counting stages have been disclosed, it will be understood of course that a greater number of cathodes may be utilized. For example, conveniently there may be twenty A and B cathodes in total providing ten counting stages.

It will be understood that whenever the discharge has traversed the row of cathodes and returns to the starter or reset cathode R, a pulse is produced across the resistor 26 and a suitable record may be obtained at the indicator 27. Alternatively, counting or reading of pulses may be effected in the manner disclosed in the application of M. A. Townsend, identified hereinafter.

Furthermore, individual load circuits may be associated with the A cathodes and the discharge stepped from the cathode R to any desired A cathode by application of a proper number of pulses to the B cathodes. Thus the device may be utilized to effect selective switching.

In the embodiment of the invention illustrated in Fig. 4, the several cathodes are inclined, advantageously at like angles, relative to the anode whereby substantially different anode to cathode gap lengths are provided at the opposite end portions of each cathode. This affords a preference mechanism whereby upon pulsing of the B cathodes the discharge is stepped to the right in the figure. As illustrated in Fig. 5B, the cathodes may be plane, or substantially plane, and rectangular.

In another form, illustrated in Fig. 5A, each of the cathodes comprises a relatively large area portion 28 and a small area or thin tail portion 29. The tail portion 29 of each cathode extends toward and may overlie the portion 28 of the next preceding cathode. Because of the asymmetry of each cathode, the discharge at any one concentrates at the large area portion 28; thus the tail portion of the next succeeding cathode projects toward or into a region of high ionization density whereas the portion 28 of the next preceding cathode is in a region of low ionization density. Hence, another preference, in addition to that due to the inclination of the cathodes is provided whereby, inter alia, increased counting margins are realized.

In the embodiment of the invention illustrated in Fig. 6, directional preference of stepping is obtained or enhanced by the relative disposition and potential of the several cathodes. As shown in this figure, each B cathode is closely adjacent the next preceding A cathode and is relatively widely spaced from the next succeeding A cathode. Each A cathode is connected to the negative terminal of the biasing source 21 by way of a parallel resistor-condenser combination 30, 31. The bias upon the B cathodes due to the source 23 may be, in a typical case, 80 volts negative with respect to the anode 16 and the bias upon the A cathodes due to the sources 21 and 23 may be 130 volts negative with respect to the anode. The negative pulses applied by the source 22 may be of about 60 volts peak value.

The operation of the device will be understood from the following: assume that the discharge obtains at the cathode $A_2$ and that a pulse is applied from the source 22. All of the B cathodes are thereby driven negative relative to the A cathodes. Because the cathode $A_2$ is closer to the cathode $B_2$ than it is to the cathode $B_1$, the discharge will shift from cathode $A_2$ to cathode $B_2$. Upon cessation of the pulse, it will be noted that whereas the cathode $A_3$ is at substantially the full negative bias potential, the cathode $A_2$ may be at a substantially smaller potential because of the drop across the RC circuit 30, 31 associated with the cathode $B_2$. Thus, by correlation of the time constant of this circuit, the pulse length and the deionization time, the relative potentials of the cathodes $A_2$ and $A_3$ at the time of cessation of the pulse applied to the B cathode may be made such that the discharge shifts from the cathode $B_2$ to the cathode $A_3$. The basic requirement is that the pulse length be greater than the deionization time but less than the time constant of the RC circuit.

Thus, the construction illustrated in Fig. 6 provides a directional preference for stepping of the discharge on a voltage basis. Hence, cathodes of symmetrical construction can be employed. Of course, the directional preference may be enhanced and greater counting margins obtained, if desired, by utilizing asymmetrical cathodes, thereby providing a combination of preference mechanisms. Individual load circuits may be coupled to the resistors 30.

The combination of preference mechanisms may be utilized also, as illustrated in Fig. 7, to effect stepping of the pulse from one cathode to the next succeeding one in response to a pulse, as distinguished from an advance of two cathodes per pulse as in the embodiments of the invention described heretofore. Assume, in Fig. 7, that a discharge exists between the cathode $B_1$ and the anode 16. As a result, the condenser 31 associated with this cathode charges to a potential equal to the drop across the associated resistor 30. A positive pulse is applied to all the cathodes from the source 22, sufficient to extinguish the discharge. If the pulse length is such that, upon cessation of the pulse, the anode voltage recovers before the voltage drop across the RC combination in question disappears and also before the gap at which the discharge existed deionizes completely, the discharge will be established at either cathode $A_1$ or $A_2$; which of these cathodes may be preset by use of asymmetrical cathodes, such as in the devices illustrated in Figs. 1 and 4. Thus, it will be appreciated that the number of stages that may be provided in a given space or by a given number of cathodes can be increased by combined voltage and cathode asymmetry preference mechanisms.

Resistor-condenser combinations 30, 31 in series with the cathodes may be utilized advantageously to extend the upper limit of the counting frequency that can be employed. A typical device embodying this feature is illustrated in Fig. 8 and comprises asymmetrical A and B cathodes equally spaced. As discussed in the application of M. A. Townsend, identified hereinabove, the deionization time of any cathode-anode gap enters into the determination of the upper limit of the counting speed that can be utilized. This limitation may be reduced by correlating the resistance 30 and condenser 31 so that the voltage of any cathode from which the discharge has been shifted does not recover until after the discharge sustains at the next succeeding cathode. Specifically, the time constant of the RC circuit should be of the order of, but greater than, the deionization time, whereby despite incomplete deionization the discharge will not return to the cathode from which it is being stepped. In typical devices, wherein the gas was neon at a pressure of 40 millimeters of mercury, a four-fold increase, from 1,000 to 4,000 cycles per second, in the maximum counting speed has been realized. For such devices, typical values for the resistances 30 and capacitances 31 are 5,000 ohms and 0.05 microfarad respectively.

The ionization and deionization times vary with the gas filling employed. It has been found that for hydrogen these times are very much shorter than in rare gases. For example, for a typical device having a filling of neon at a pressure of 50 millimeters of mercury, the maximum counting speed was 1,000 cycles per second whereas for a structurally similar device wherein the gas was hydrogen at a pressure of 20 millimeters of mercury the maximum counting speed was greater than 60,000 cycles per second.

It will be understood that in devices of the construction illustrated in Figs. 4 to 8 a starting or reset cathode may be employed as in the device shown in Fig. 3. Furthermore, although in the specific devices disclosed the cathodes are mounted in rows, they may be disposed in a variety of arrays and the preference mechanism or mechanisms utilized to effect selective stepping of the discharge in different manners. Also, although a combination of bias source and direct-current pulse source have been shown for pulsing the cathodes, equivalent alternating-current pulsing means may be utilized. Finally, it will be understood that although specific embodiments of the invention have been shown and described, they are but illustrative and that various modifications may be made therein without departing from the scope and spirit of this invention.

Reference is made of the application Serial No. 101,322, filed June 25, 1949, now Patent 2,575,370, granted November 20, 1951, wherein a related invention is disclosed and claimed.

What is claimed is:

1. A gaseous discharge device comprising an anode, an array of similar glow cathodes having asymmetrical active surfaces opposite said anode, whereby a discharge from any of said surfaces provides regions of substantially different ionization densities, said cathodes being positioned with the high ionization density producing region of each in juxtaposition to the low ionization density producing region of the next succeeding cathode, individual resistance-capacitance circuits connected between said cathodes and said anode, means biasing said anode positive with respect to said cathodes, means for initiating a discharge between said anode and one of said cathodes, and means for selectively shifting the discharge along the array of cathodes comprising means for applying voltage pulses to certain of said cathodes.

2. A gaseous discharge device in accordance with claim 1 wherein each of said surfaces comprises a relatively large area portion and a relatively small area portion extending from said large area portion.

3. A gaseous discharge device in accordance with claim 1 wherein said surfaces are triangular.

4. A gaseous discharge device comprising an anode, an array of similar glow cathodes having asymmetrical active surfaces opposite said anode, whereby a discharge from any of said surface provides regions of substantially different ionization densities, said cathodes being positioned with the high ionization density producing region of each in juxtaposition to the low ionization density producing region of the next succeeding cathode, a plurality of similar resistance-capacitance circuits, one for each cathode and connected therebetween and said anode, means biasing said anode positive with respect to said cathodes at a potential sufficient to sustain a discharge between any cathode and said anode, and means for applying to said cathodes simultaneously positive signal pulses of amplitude to reduce the anode-cathode potentials below the sustaining value, said pulses being of duration shorter than the time constant of said resistance-capacitance circuits and greater than the deionization time of the cathode-anode gaps.

5. A gaseous discharge device comprising an anode, an array of similar glow cathodes having asymmetrical active surfaces opposite said anode, whereby a discharge from any of said surface provides regions of substantially different ionization densities, said cathodes being positioned with the high ionization density producing region of each in juxtaposition to the low ionization density producing region of the next succeeding cathode, means including individual resistance-capacitance circuits therefor connecting one set of alternate cathodes together, means including individual resistance capacitance circuits therefor connecting the other alternate cathodes together, means biasing said one set positive with respect to said other cathodes, a source biasing said anode positive with respect to said cathodes at a potential sufficient to sustain a discharge, and means for applying voltage pulses to said one set of cathodes, of amplitude sufficient to drive the cathodes of said one set negative with respect to said other cathodes, the time constant of said resistance-capacitance circuits being of the order of but greater than the deionization time of the cathode-anode gaps.

6. A gaseous discharge device comprising an anode, an array of similar glow cathodes having asymmetrical active surfaces opposite said anode, whereby a discharge from any of said surfaces provides regions of substantially different ionization densities, said cathodes being positioned with the high ionization density producing region of each in juxtaposition to the low ionization density producing region of the next succeeding cathode, means including individual resistance-capacitance circuits therefor connecting one set of alternate cathodes together, means including individual RC circuits therefor connecting the other alternate cathode together, means biasing said one set positive with respect to said other cathodes, a source biasing said anode positive with respect to said cathodes at a potential sufficient to sustain a discharge, and means for applying voltage pulses to said one set of cathodes, of amplitude sufficient to drive the cathodes of said one set negative with respect to said other cathodes, the time constant of said resistance-capacitance circuits being of the order of but greater than the deionization time of the cathode-anode gaps.

7. A gaseous discharge device of the stepping tube type comprising an anode, a plurality of first cathodes arranged in spaced relation along a path and a second cathode arranged intermediate each two first cathodes, each of said cathodes being equally spaced from said anode and comprising conductive means extending intermediate the preceding cathode in said path and said anode for establishing a preferential glow transfer path from that preceding cathode each time a glow discharge is present between said preceding cathode and said anode, a source of pulses to be stored, means applying said pulses to said second cathodes, and means for rendering said tube operable sequentially to advance the glow discharge from one first cathode to the next first cathode in response to each pulse applied to said second cathodes.

8. A gaseous discharge device of the stepping tube type comprising an anode and a plurality of cathodes arranged in spaced relation along a path, said cathodes being each of similar configuration, equally spaced from said anode, and each comprising conductive means extending intermediate the preceding cathode in the path and said anode, whereby, when a discharge exists at said preceding cathode, said conductive means extends into the region of high ionization density.

9. A gaseous discharge device of the stepping tube type comprising an anode, a plurality of first cathodes arranged in spaced relation along a path and a second cathode arranged intermediate each two first cathodes, each of said cathodes being equally spaced from said anode and comprising conductive means extending intermediate the preceeding cathode in said path and said anode for establishing a preferential glow transfer path from that preceding cathode each time a glow discharge is present between said preceding cathode and said anode.

10. A gaseous discharge device comprising an anode, an array of glow cathodes arranged in alternate groups, individual resistance-capacitance circuits connected between said cathodes of one group and said anode, means biasing said anode positive with respect to said cathodes, means for initiating a discharge between said anode and one of said cathodes, and means for applying pulses to said other group of cathodes to shift said discharge along said array, each cathode of said other group being positioned between two adjacent cathodes of said one group so as to be closer to the preceding cathode of said one group in said array, whereby said other cathode is in a region of higher ionization potential when a discharge is present at the preceding cathode in said array than when a discharge is present at the succeeding cathode in said array.

11. A gaseous discharge device comprising an anode, a plurality of cathodes defining an ordered array of discharge gaps arranged to fire in sequence with the discharge at one gap of the array priming the next successive gap by ionization coupling, said array comprising pairs of cathodes, the separation between the cathodes of each pair being small and the separation between cathodes not of the same pair being larger so that each two successive gaps of the array have alternatively a large and a small value of ionization coupling between them.

12. In a gaseous discharge device for effecting storage of electrical manifestations wherein the transfer of a glow discharge from one stable position to another indicates the storage of one electrical manifestation, a single anode, and a plurality of cathodes positioned in sequence along a closed glow transfer path, each cathode being physically positioned relative to the anode to generate a gradient of electric field intensity along said path for each of said cathodes when a potential difference exists between that cathode and the anode.

13. In a gaseous discharge device for effecting storage of electrical manifestations wherein the transfer of a glow discharge from one stable position to another indicates the storage of one electrical manifestation, an anode, and a plurality of cathodes equidistant from said anode and positioned in sequence along a closed transfer path, each cathode being unequally spaced along its length from said anode to generate a gradient of electric field intensity along said path for each of said cathodes when a potential difference exists between that cathode and the anode.

14. In a gaseous discharge device, the combination comprising an anode, a plurality of cathodes equidistant from said anode and positioned in sequence along a closed path, and means including the unequal spacing of each cathode along its length relative to the anode to generate a gradient of electric field intensity along said path for each of said cathodes.

15. In a gaseous discharge device the combination comprising an anode, and a plurality of cathode surfaces each having a region of greater radius of curvature and a region of lesser radius of curvature, said cathode surfaces being positioned along a closed path in such a way that the region of lesser radius of curvature of any such surface is adjacent to the region of greater radius of curvature for one of its two adjacent cathode surfaces.

16. The device set forth in claim 15 wherein said cathodes are positioned so that said regions of lesser radius of curvature lie closer to said anode than said regions of greater radius of curvature.

17. A gaseous discharge device of the stepping tube type comprising an anode and a plurality of cathodes arranged in spaced relation along a path, each of said cathodes being similarly positioned and having a first portion extending above a second portion of an adjacent cathode.

18. A gaseous discharge device of the stepping tube type comprising an anode, and a plurality of cathodes arranged in spaced relation along a path, said cathodes being each of similar configuration and each comprising conductive means extending above a portion of an adjacent cathode whereby when a discharge exists at said adjacent cathode, said conductive means extends into the region of high ionization density.

19. A gaseous discharge device of the stepping tube type in accordance with claim 18 wherein each of said cathodes is similarly inclined to the plane of said path.

References Cited in the file of this patent

UNITED STATES PATENTS

| Number | Name | Date |
|---|---|---|
| 1,898,626 | Healy | Feb. 21, 1933 |
| 2,427,533 | Overbeck | Sept. 16, 1947 |
| 2,443,407 | Wales | June 15, 1948 |
| 2,473,159 | Lyman | June 14, 1949 |
| 2,553,263 | Loughren | May 15, 1951 |
| 2,575,370 | Townsend | Nov. 20, 1951 |
| 2,575,372 | Townsend | Nov. 20, 1951 |
| 2,575,517 | Hagen | Nov. 20, 1951 |
| 2,623,199 | Ridler | Dec. 22, 1952 |
| 2,687,496 | Wales | Aug. 24, 1954 |
| 2,690,525 | Koehler | Sept. 28, 1954 |